United States Patent [19]

Furusawa et al.

[11] Patent Number: 5,522,922
[45] Date of Patent: Jun. 4, 1996

[54] AQUEOUS INK COMPOSITION

[75] Inventors: Mitsuhiko Furusawa, Tano-gun; Kaname Masugi, Honjo, both of Japan

[73] Assignee: Mitsubishi Pencil Kabushiki Kaisha, Tokyo, Japan

[21] Appl. No.: 482,089

[22] Filed: Jun. 7, 1995

Related U.S. Application Data

[63] Continuation-in-part of Ser. No. 213,042, Mar. 15, 1994, abandoned.

[30] Foreign Application Priority Data

Mar. 17, 1993 [JP] Japan ..................... 5-57356

[51] Int. Cl.$^6$ .................................. C09D 11/02
[52] U.S. Cl. .................. 106/22 R; 106/22 D; 106/22 K
[58] Field of Search .................. 106/22 R, 22 D, 106/22 K

[56] References Cited

U.S. PATENT DOCUMENTS

| | | | |
|---|---|---|---|
| 4,279,662 | 7/1981 | Bunes | 106/289 |
| 4,316,918 | 2/1982 | Bunes | 426/540 |
| 4,786,327 | 11/1988 | Wenzel et al. | 106/22 |
| 5,017,227 | 5/1991 | Koike et al. | 106/22 |

FOREIGN PATENT DOCUMENTS

| | | |
|---|---|---|
| 4-298577 | 10/1992 | Japan . |
| 4-318081 | 11/1992 | Japan . |

*Primary Examiner*—Helene Klemanski
*Attorney, Agent, or Firm*—Darby & Darby

[57] ABSTRACT

An aqueous ink composition comprising a dye, water and a pH adjustor in which all the components except the pH adjustor are food additives or conformed materials and the pH adjustor is cosmetic triethanolamine as described in the Japanese Standards of Cosmetic Ingredients (Yakuji Nippo, Ltd., second edition).

5 Claims, No Drawings

AQUEOUS INK COMPOSITION

This application is a continuation-in-part of U.S. Ser. No. 09/213,042, filed Mar. 15, 1994, now abandoned.

FIELD OF THE INVENTION

The present invention relates to an aqueous ink composition, and more particularly, an aqueous ink composition which exhibits consistent pH, dependable color, and consistent preservative performance.

BACKGROUND OF THE INVENTION

Techniques for the preparation of aqueous ink compositions are well known. For example, an aqueous ink composition can be prepared by combining the essential component, a water-soluble dye solution, with a solvent, a surface active agent, a pH adjustor, and a preservative.

In recent years, ecological and safety problems related to coloring materials and their components have received attention. However, the attention has been primarily focused on oily inks, which include harmful volatile components. The relatively minor effects of aqueous ink compositions have been largely ignored. As a result, materials for use in aqueous ink compositions are often selected with performance and cost, not safety, as the overriding considerations.

This view is shortsighted, however, because harmful bacteria can contaminate and even thrive in aqueous ink compositions. Such contamination can not only adversely influence the performance of the ink, i.e., deteriorate writing performance and generate a unpleasant smell, but it can also have a detrimental effect the user, who can unconsciously inhale bacteria or mold spores.

This problem is conventionally addressed in aqueous ink compositions by the addition of a preservative which retards the growth of harmful bacteria and mold. The preservatives are generally effective by inhibiting the development or by killing the harmful microorganisms. However, the more effective preservatives tend to be toxic not only to the bacteria and mold, but also to humans, thus creating a safety concern for their use.

Japanese Patent Application Laid-open Nos. (Hei) 4-298577 and (Hei) 4-318081 disclose an aqueous ink composition that includes a dye as an essential component and additional necessary components such as a solvent, a surface active agent, a preservative and a pH adjustor. All components are described as food additives or conformed materials. Furthermore, both publications suggest the use of pH adjustors in aqueous ink compositions, such as citric acid, tactic acid, malic acid, succinic acid, and gluconic acid, which are generally described as sour seasonings. Further, the documents teach the use of phosphoric acid and ammonium sulfate which are generally used as brewing materials, and, further, sodium carbonate, sodium hydrogen carbonate, potassium carbonate and dipotassium phosphate, which are alkali materials for food manufacture, as described in the Japanese Standards for Food Additives (Tokyo, Ministry of Health and Welfare, 6th ed).

However, the described pH adjusters of the aqueous ink composition fail to maintain the pH of the composition over time. This results in alteration of ink color and breakdown of the ability of the preservative to avoid microbial contamination. Therefore, there is a need in the art for safe aqueous ink compositions which maintain the desired pH value over time.

SUMMARY OF THE INVENTION

Therefore, an object of the present invention is to provide an aqueous ink composition which is safe for human use and which also has a relatively consistent pH over time. The stable pH results in consistent ink color and continued resistance to microbial contamination as the ink ages.

The present invention is directed to an aqueous ink composition comprising a dye, water, a pH adjustor, and optionally, a solvent, a surface active agent, and a preservative, where all components except the pH adjustor are food additives or conformed materials, as described below and in the Japanese Standards of Food Additives (Tokyo, Ministry of Health and Welfare), which is hereby incorporated by reference. The pH adjustor is triethanolamine as described below and in the Japanese Standards of Cosmetic Ingredients (Yakuji Nippo, Ltd., second edition), which is also incorporated by reference.

DETAILED DESCRIPTION OF THE INVENTION

The aqueous ink composition of the present invention comprises a dye, water, and a pH adjustor, and optionally, additional components where all components except the pH adjustor are described in the Japanese Standards of Food Additives (Tokyo, Ministry of Health and Welfare, sixth edition). The pH adjustor is triethanolamine as described in the Japanese Standards of Cosmetic Ingredients (Yakuji Nippo, Ltd., second edition).

Among the additional components which can be used in the aqueous ink composition of the present invention are solvents, surface active agents and preservatives, where each component can be classified as a food additive or a conformed material, as defined below.

Japanese Food Sanitation Law defines a food additive as that which is "used in a process of production of food or for a purpose of processing or storage of food by means of a method of addition, incorporation, immersion, etc. to food" (Article 2, paragraph 2). Further, a food additive is a chemically synthesized product if it is "a substance obtained by causing a chemical reaction other than a decomposition reaction on an element or a compound by a chemical means" (Article 3, paragraph 2).

Although 347 additives had been designated by November, 1986, the number of designated additives is gradually decreasing because of safety concerns. To be classified as "safe," an additive must be relatively harmless to humans even if consumed for an entire lifetime. Thus, chemicals to be added to food must pass a chronic toxicity test. This test involves experimentation over the entire lifespan of an animal model. Generally, these tests are performed in mice or rats and, therefore, run for over two years. Often testing in more than one species is required. The results of the tests are used to determine the maximum non-adverse dosage for the animal model, and this value is used to calculate the acceptable daily intake (ADI) for humans. This value is figured by multiplying the maximum non-adverse dosage by a safety coefficient of $1/100$ to $1/250$. Daily average consumption guidelines are set at one-half to one-eighth ADI, building in additional assurance that the additive is being used safely. This strict standard for use is applied to about 200 of the 347 designated additives.

Food additives can be classified into five categories. First, there are those which satisfy the sensory characteristics such as seasonings, acidifying agents, artificial sweeteners, flavoring agents, coloring agents, color fixatives, and bleaching agents. Secondly, there are additives which prevent denaturation and deterioration such as preservatives, antimicrobial agents, and antioxidants. Thirdly, there are additives which are required for efficient production of the food, such as antifoaming agents. Fourthly, there are additives used for modification or maintenance of quality such as wheat modifiers, adhesive agents, stabilizers, emulsifiers, and binders. Lastly, there are additives which are used for nutrition enrichment such as vitamins. The Japanese Standards for Food Additives (Tokyo, Ministry of Health and Welfare, sixth edition) describes specific standards for particular food additives. The standards are provided by the Minister for Health and Welfare and based on Japanese Food Sanitation Law.

The specific standards for preferred food additives for use in the present invention will be described below during discussion of the individual additive.

In addition to those substances classified as food additives, the present invention can be practiced with those substances classified as "conformed materials." There are two types of conformed materials. A conformed material can be produced by the mixing and processing of a variety of substances which are described in the Japanese Standards of Food Additives (Tokyo, Ministry of Health and Welfare, 6th edition). Such a conformed material can then be marketed as a food additive. For example, a mixture of sodium benzoate and butyl parahydroxybenzoate (both described in the Japanese Standards of Food Additives (Tokyo, Ministry of Health and Welfare, sixth edition)) is commercially available as an additive to prevent soft drinks or syrup from becoming contaminated with bacteria or mold. A second type of conformed material is a substance which is not described in the Japanese Standards of Food Additives (Tokyo, Ministry of Health and Welfare, sixth edition) or some other reference volume, such as the Japanese Pharmacopoeia (the eleventh edition) which is hereby incorporated by reference. However, this material can be added to food if permission is obtained from the Japanese Ministry of Health and Welfare. Two examples of conformed materials are β-carotene and DHA, which can be added to powdered milk.

Standards for the triethanolamine [$N(CH_2CH_2OH)_3$] which call be used in the present invention (termed herein "cosmetic triethanolamine") are described in the Japanese Standards of Cosmetic Ingredients (Yakuji Nippo, Ltd., second edition). The formula for triethanolamine is as follows:

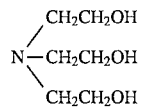

Specifically, the Japanese Standards of Cosmetic Ingredients (Yakuji Nippo, Ltd., second edition) specifies that triethanolamine must contain chiefly triethanolamine, and usually diethanolamine and monoethanolamine. It must be not less than 99.0% and not more than 105% of triethanolamine ($C_6H_{15}NO_3$, M.W. 149.19). Triethanolamine is colorless to light yellow, a viscous liquid, which has a slight ammoniacal odor. The specific gravity is 1.120–1.128 and the refractive index is 1.481–1.486. Both measurements are done using conventional methods in the art. Upon ignition of 2 g, there can be no more than 0.05% remaining.

To determine if triethanolamine is present, 1 ml is added to 0.1 ml of cupric sulfate TS, and a blue color will develop. To the resulting solution 5 ml of sodium hydroxide TS is added, and the solution is evaporated to 2 ml by boiling, yet the solution color will not change. A second test involves shaking 5 ml of a 1:10 dilution of triethanolamine with 1 ml of ammonium thiocyanate-cobaltous nitrate TS, 5 ml of water and 5 ml of a saturated solution of sodium chloride, and a red color will develop. If the solution is shook with 10 ml of amyl alcohol, almost no color will develop in the amyl alcohol layer. Finally, 1 ml of triethanolamine as heated will produce a gas which will change moistened red litmus paper to blue. An assay for triethanolamine involves shaking 2 g of triethanolamine with 75 ml of water, and titration with 1N hydrochloric acid is performed. The indicator used is 2 drops methyl red TS. For each ml of 1N hydrochloric acid there is 149.19 mg of triethanolamine present. Triethanolamine thus described is safe to be used in the preferred embodiment of the present invention.

Triethanolamine is used to enhance composition stability with time and to preserve resistance of the aqueous ink composition to harmful bacteria and mold. The stability can be determined by measuring pH, assaying for change in color, observation of deposition of a solid within the ink, or measurement of preservative effectiveness as demonstrated by the resistance to microbial contamination by the composition.

Furthermore, triethanolamine suitable for the present invention is limited to that which meets the standards described above and in the Japanese Standards of Cosmetic Ingredients (Yakuji Nippo, Ltd., second ed.). Therefore, industrial triethanolamine cannot be used, because, for example, triethanolamine described in the Japanese Standards for Cosmetic Ingredients is of a higher purity.

Additional differences between cosmetic triethanolamine and industrial triethanolamine are described below in more detail.

As mentioned above, differences between cosmetic triethanolamine and industrial triethanolamine can be attributed to impurities contained in industrial triethanolamine. For example, as proscribed by the Japanese Standards of Cosmetic Ingredients (Yakuji Nippo, Ltd., second ed.), triethanolamine that is used as a cosmetic material can not contain nitrosamine impurities, such as dimethyl nitrosamine and diethyl nitrosamine. Such impurities are toxic because the nitrosamine reacts with halogen-substituted compounds having a hydroxy group to generate a harmful product. Organically, nitrosamine has proven cancer-causing and thus a health threat to humans.

Additionally, effective solvents for aqueous ink such as ethylene glycol and diethylene glycol cannot be used when raw materials for the composition are to be selected from food additives. However, as described below, use of these solvents is not required to produce an effective ink composition.

A further consideration is the adverse effect heavy metals have on the stability over time of the ink composition, as evidenced in changes in ink color and reduced resistance to bacterial and fungal contamination.

In view of the foregoing, triethanolamine used in the present invention is limited to cosmetic-grade triethanolamine, thus ensuring the ink will be safe for human use.

The amount of triethanolamine to be added to the composition is in the range of about 0.01 to 1.0%, preferably about 0.01 to 0.1% by weight based on the weight of the aqueous ink composition. If the amount of triethanolamine is less than 0.01% by weight, color changes are liable to occur. If more than 1.0% by weight is used, the composition pH rises and preservative function deteriorates.

The addition of triethanolamine to the aqueous ink composition of the present invention stabilizes the materials of the composition. For example, the dye is stabilized resulting in consistent color, and the preservative is stabilized, resulting in consistent resistance to microbial contamination. Thus, the entire ink composition is stabilization over time with the addition of triethanolamine. As an added advantage, the tendency of pens to dry up because of remaining uncapped is less pronounced when the present ink composition is utilized.

The dye for use in the present invention can be any of the legally designated dyes, that is, those colorants categorized as food additives in Japan. These colorants are described in the Japanese Standards for Food Additives (Tokyo, Ministry of Health and Welfare, sixth edition). Typical examples of suitable dyes include Red Nos. 2, 3, 102, 104, 105 and 106 for Food, Yellow Nos. 4 and 5 for Food, and Blue Nos. 1 and 2 for Food. The dyes may be used singly in the composition or in combinations of two or more. It is noted that Red No. 3 for Food, Yellow Nos. 4 and 5 for Food and Blue No. 2 for Food are also designated as safe food colorants in the United States and Germany. Most desired colors can be prepared by mixing these dyes legally designated as food additives.

The Japanese Standards for Food Additives (Tokyo, Ministry of Health and Welfare, sixth edition) provides standards for Food Red No. 3 ($C_{20}H_6I_4Na_2O_5 \cdot H_2O$; M.W. 897.88). The formula for Food Red No. 3 is as follows:

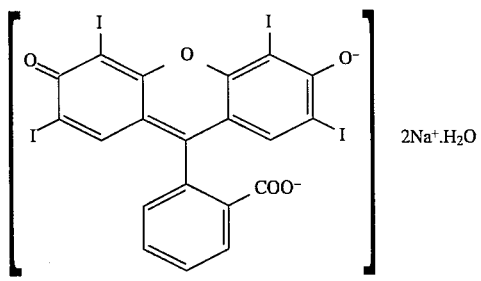

Food Red No. 3, or erythrocin, must be not less than 85% of 3', 6'-dihydroxy-2',4',5',7',-tetraiodosprio[isobenzofurna-1(3H),9'-[9H]xanthene]-3-one or its disodium salt or its monohydrate form. The additive is red to brown, is in a powder or particle form, and has no odor.

To test for the presence of Food Red No. 3 an aqueous (1:1000) solution is checked for the characteristic blued red color. Further, a red precipitate is produced when 1 ml of hydrochloric acid is added to 5 ml of an aqueous solution (1:1000). A 1:100 sulfuric acid solution of they dye presents a brown yellow color, and when 2–3 drops of this solution is added to 5 ml of water, an orange red precipitate is produced. Additionally, when 0.1 g of the dye is dissolved in 500 ml of an ammonium acetate solution (3:2000) and 3 ml of this solution is brought to 200 ml using additional ammonium acetate, the maximum absorption of the resulting solution is wavelengths 524–528 nm.

The dye must be pure enough to be not more than 0.20% water-insoluble, as determined by the tar pigment method. It must have a pH of 6.5–10.0 when 1 g is dissolved in 100 ml of water. There can be no more than 2.0% chlorides and sulfates, not more than 0.4% sodium iodide, not more than 200 micrograms per gram of Zn, not more than 20 microgram per gram of Pb, not more than 4.0 micrograms per gram of $As_2O_3$, and other pigments cannot comprise more than 12.0% by dry weight, all determined by the tar pigment test method.

Red dye No. 3 is a xanthene pigment discovered by Kussmaul in 1876. It was designated as a food additive on Jul. 13, 1948. Since a granule form has been newly produced since Jul. 15, 1964, "powder" in the description of the nature of the dye was changed to "powder or particle" and "6–9" in the liquid acidity description or alkalinity in the purity description was changed to 6.5–10. This pigment is widely used as a food additive in various countries such as the United States and Canada. The pigment number is C.I. 45430, C.I. Food Red 14, Schultz 887 E 127. It is also known as FD & C Red No. 3 in the United States, Lebensmitel-Rot Nr. 4 in Germany, Erythrosine B, and Erythrosine Bluish. The existing law which governs this chemical is the Law for Regulation of Examination, Production, and the like of Chemicals number 5, Organic Heterocyclic Low Molecular Weight, Articles 1503 and 1596. Red dye No. 3 which satisfies the above qualifications can be used in the preferred embodiment of the present invention.

The Japanese Standards of Food Additives (Tokyo, Ministry of Health and Welfare, sixth edition) provides standards for Food Yellow No. 4, or tartrazine ($C_{18}H_9N_4Na_3O_9S_2$; M.W. 534,37). The formula for Food Yellow No. 4 is as follows:

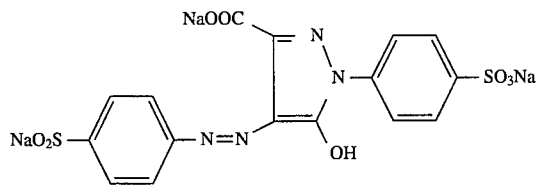

This dye must contain not less than 85% of 5-hydroxy-1-4-(4-sulfophenyl)-4-(4-sulfophenylazo)-3-pyrazol carboxylic acid or its trisodium salt. The additive is orange yellow to orange, is in a particle or powder form, and has no odor.

Tests for conformation of its presence include an aqueous solution (1:1000) has a yellow color. A 1:100 sulfuric acid solution of they dye presents a yellow color, and when 2–3 drops of this solution is added to 5 ml of water, a yellow color is produced. Additionally, when 0.1 g of the dye in 500 ml of an ammonium acetate solution (3:2000) and 3 ml of this solution is brought to 100 ml with additional ammonium acetate, the resulting solution has a maximum absorption at wavelengths 426–430 nm.

Further, the dye must be of a purity to be not more than 0.20% water-insoluble, as determined by the tar pigment method. There can be no more than 6.0% chlorides and sulfates, not more than 20 microgram per gram of Pb, not more than 4.0 micrograms per gram of $As_2O_3$, and other pigments cannot comprise more than 10.0% by dry weight, all determined by the tar pigment test method.

This is a monoazo pigment which was discovered by Zeigler in 1884. It was designated as a food additive on Jul. 13, 1948 under Ordinance No. 23 of the Ministry of Health and Welfare. Since a granule form has been newly produced sine Jul. 15, 1964, "powder" in the description of the nature of the dye was changed to "powder or particle." The pigment number of the dye is C.I. 19149, C.I. Food Yellow 4, Schultz 727, E 102. Food Yellow No. 4 is known as FD & C No. 5 in the United States and tartrazine. The existing law which governs this chemical is the Law for Regulation of Examination, Production, and the like of Chemicals number 5, Organic Heterocyclic Low Molecular Weight, Article 1402. Food Yellow No. 4 meeting these standards disclosed above can be used in the preferred embodiment of the present invention.

The Japanese Standards of Food Additives (Tokyo, Ministry of Health and Welfare, sixth edition) provides standards for Food Blue No. 2, or indigo carmine ($C_{15}H_8N_2Na_2O_8S_2$;

M.W. 466.36). The formula for Food Blue No. 2 is as follows:

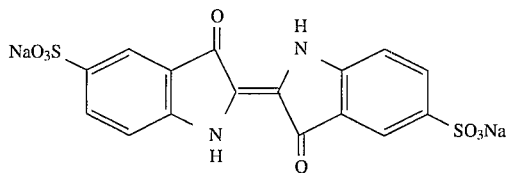

Food Blue No. 2 cannot contain less than 85% of 3,3'-dioxo-2,2'-biindolinylidene-5,5'-disulfonic acid or its disodium salt. The additive is dark purple blue to dark purple brown, is in a particle or powder form, and has no odor.

Tests for conformation of its presence include an aqueous solution (1:1000) has a purple blue color. A 1:100 sulfuric acid solution of they dye presents a dense purple color, and when 2–3 drops of this solution is added to 5 ml of water, a purple blue color is produced. Additionally, when 0.1 g of the dye is dissolved in 500 ml of an ammonium acetate solution (3:2000) and 3 ml of this solution is brought to 100 ml with additional ammonium acetate, the resulting solution has a maximum absorption at wavelengths 610–614 nm.

Further, the dye must be of a purity to be not more than 0.20% water-insoluble, as determined by the tar pigment method. There can be no more than 7.0% chlorides and sulfates, not more than 500 microgram per gram of Fe, not more than 20 microgram per gram of Pb, not more than 4.0 micrograms per gram of $As_2O_3$, and other pigments cannot comprise more than 10.0% by dry weight, all determined by the tar pigment test method.

This is an indigoid pigment discovered by Barth in 1740. It was designated as a food additive on Jul. 13, 1948 under Ordinance No. 23 of the Ministry of Health and Welfare. Since a granule form has been newly produced thereafter, "powder" in the description of the nature of the dye has been changed to "powder or particle" on Jul. 15, 1964. The pigment number of this dye is C.I. 73015, C.I. Food Blue 1, Schultz 1309, E 132. It is known as FD & C Blue No. 2 in the United States, and as indigo carmine, and indigotine. The existing law which governs this chemical is the Law for Regulation of Examination, Production, and the like of Chemicals number 5, Organic Heterocyclic Low Molecular Weight, Article 1650. Food Blue No. 2 satisfying these above-described criteria can be used in the preferred embodiment of the present invention.

In the aqueous ink composition of the present invention, a solvent described in the Japanese Standards for Food Additives (Tokyo, Ministry of Heath and Welfare, sixth edition) should be used. The solvent functions to enhance resistance to contamination and to increase preservative stability. Additionally, solvent is used when the desired dye does not sufficiently dissolve in water to be produce an efficient ink.

Typical examples of the solvents include glycerin, D-sorbitol and propylene glycol, and they may be used singly or in combinations of two or more.

Propylene glycol for use in the preferred embodiment of the present invention is described in the Japanese Standards for Food Additives (Tokyo, Ministry of Health and Welfare, sixth edition). The formula for propylene glycol is as follows:

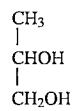

It must contain not less than 98.0% propylene glycol ($C_3H_8O_2$; M.W. 76.10), and is colorless, transparent, and viscous liquid, having no odor and a slight bittersweet taste.

A test for its presence includes adding 0.6 g of potassium hydrogensulfate to 1 ml of this article and heating, such that an odor like fruit is produced. Additionally, two or three drops of propylene glycol are incorporated into 0.7 g of tripheylcholormethan, 1 ml pyridine is added, and heated for 1 hour in a water bath using a reflux cooler. After cooling, 20 ml of acetone is added, warmed and dissolved. 0.02 g of activated carbon is added, shaken and mixed followed by filtration, and dried in a desiccator for 4 hours. The melting point thus obtained is 174°–178° C.

The additive must be of the purity to have a specific gravity of 1.036–1.040 and not less than 95% v/v will fractionate at 185°–189° C. A test for free acid includes adding 1 ml of phenolphthalein to 50 ml of water, to which a sodium hydroxide solution (1:2500) is added until the liquid presents a vermilion color which continues for 30 seconds. 10 ml of this article is weighed, added, and incorporated. When 0.20 ml of a 0.1N sodium hydroxide solution is subsequently added, the liquid present a vermilion color which continues for not less than 30 seconds.

Not more than 10 microgram per gram can be Pb, not more than 4.0 microgram per gram can be $As_2O_3$, the water content of 10 g can be no more than 0.20%, and residual matter after vigorous heating can be no more than 0.05%.

Propylene glycol was produced by Wurty in 1859 from a hydrosylate of propylene glycol diacetate. It has been industrially produced in the United States since about 1930, and has been used for the purpose of a solvent or a preservative for food and pharmaceuticals. Because its dissolving ability is better than glycerol, it was used as an alternative for glycerol during the shortage of this chemical during World War II. It also has a property to prevent proliferation of fungi and is not subjected to fermentation. The FDA approved this article to be used as a solvent for food in 1941. This article has been described in the United States Pharmacopeia since the 1950 edition as a solvent for pharmaceuticals. It was designated as a food additive in 1954 in Japan. The moisture-keeping property and the wetting property of the article was noticed after 1965, and the amount of use for raw noodles and so on increased. Thus, the standard for use was established in June, 1981. Propylene glycol meeting the above-described standards is approved for use as a food additive, and thus can be used in the preferred embodiment of the present invention.

A surface active agent which is described as an emulsifying agent in the Japanese Standards of Food Additives (Tokyo, Ministry of Health and Welfare, sixth edition) may be used to improve wetability. Typical examples of the surface active agent include esters of glycerin and fatty acids, esters of sucrose and fatty acids, esters of sorbitan and fatty acids and esters of propylene glycol and fatty acids, and they may be used singly or in combinations of two or more.

Specifically, the Japanese Standards of Food Additives (Tokyo, Ministry of Health and Welfare, sixth edition) discloses that sorbitan esters of fatty acids are esters of fatty acid and sorbitan which is a white to yellow brown powder, flake, particle, waxy mass, or liquid.

A confirmation test for its presence includes adding 5 ml of anhydrous ethanol to 0.5 g, followed by heating and dissolving, to which 5 ml of sulfuric acid (1:20 solution) is added and heated in a water bath for 30 minutes, followed by cooling. An oil drop of a white to yellow white solid is deposited. The oil drop or solid is separated to which 5 ml of ether is added, which will cause the solid to dissolve. The residual liquid after separation of the oil drop is taken and 2 mil of a newly mixed catechol solution (1:10) is added with mixing. 5 ml of sulfuric acid is added with mixing and the obtained liquid is vermilion to red brown color.

Further, the ester must be of a purity to have an acid value of not more than 15. It cannot contain more than 10 microgram per gram of Pb, and 4.0 microgram per gram of $As_2O_3$. After vigorous heating, not more than 1.5% can remain as a residue.

Sorbitan ester of fatty acid is a nonionic surfactant developed by ALTAS Powder Co. in 1945, and its trade name, Span, is famous. It was designated as a food additive on Aug. 26, 1955. Polysorbate obtained by adding ethylene oxide to this article is a representative hydrophilic surfactant, which is widely used as a food additive in outside of Japan, however, it is not designated in Japan. Using the combination of this article and polysorbate, a concept of HLB (hydrophile lipophile balance) has been proposed for representing the property of a surfactant, which is now used as an index for selection and classification of emulsifiers. Sorbitan esters of fatty acids meeting these above-described qualifications are suitable for use in the present invention.

The preservatives described in the Japanese Standards of Food Additives (Tokyo, Ministry of Health and Welfare, sixth edition), may be used in the present invention in order to prevent harmful microorganisms such as bacteria and mold from developing. Typical examples of the preservatives include sodium dehydroacetate, sorbic acid, potassium sorbate, benzoic acid, sodium benzoate, para-hydroxybenzoates, propionic acid and sodium propionate, and they may be used singly or in combinations of two or more.

The Japanese Standards of Food Additives (Tokyo, Ministry of Health and Welfare, sixth edition) provides standards for parahydroxybenzoates for use in food. The formula for butyl p-oxybenzoate (butyl p-hydroxybenzoate) is as follows:

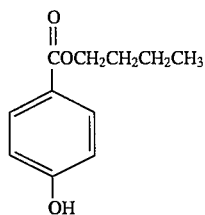

Butyl p-oxybenzoate must be not less than 99.0% of butyl p-oxybenzoate ($C_{17}H_{14}O_3$; M.W. 194.23) when in a dry state. It is a colorless crystal or white crystalline powder which has no odor.

A confirmation test for its presence includes adding 10 ml of sodium hydroxide solution (1:10) to 0.5 g of this article, which is boiled for 30 minutes, followed by evaporation and concentration to give about 5 ml. After cooling, the solution is made acidic with sulfuric acid (1:20). The produced precipitate is filtered, and sufficiently washed with water, followed by drying at 105° C. for 1 hour. The melting point thus obtained is 213°–217° C. Additionally, tow drops od acetic acid and five drops of sulfuric acid are added to 0.05 g of this article, followed by warming for 5 minutes. An obtained solution generates an odor of butyl acetate.

Further, the compound must be of the purity that its melting point ranges from 69°–72° C. The compound can contain no more than 0.55% p-oxybenzoic acid, not more than 0.024% $SO_4$, not more than 10 micrograms per gram of Pb, and not more than 4.0 microgram per gram $As_2O_3$. Residual matter present after vigorous heating cannot be more than 0.10%.

It has been reported that butyl ester has an excellent anti-microbial action among p-oxybenzoate esters. This article was designated as a food additive in 1948. The standard for use was partially changed in 1982. Parahydroxybenzoates of this description are suitable for use in the preferred embodiment of the present invention.

The aqueous ink composition of the present invention comprises the materials described in the Japanese Standards of Food Additives (Tokyo, Ministry of Health and Welfare, sixth edition) and triethanolamine described in the Japanese Standards for Cosmetic Ingredients (Yakuji Nippo, Ltd., second edition). As a result, an aqueous ink composition having pH stability with time and consistent resistance to harmful bacteria can be obtained, and the ink composition is safe for humans use.

The present invention will be described in more detail in reference to examples and comparative examples, but the scope of the present invention should not be limited to these examples. "%" in the examples and the comparative examples means % by weight.

EXAMPLES

Experiments were done to demonstrate safety of the aqueous ink composition of the present invention compared with 1) an aqueous ink composition containing industrial triethanolamine and 2) a conventional aqueous ink composition. The results are shown in Table 11.

$LD_{50}$ means a lethal dose (mg/kg) necessary to kill more than half of examined mice or rabbits when the mice or rabbits are orally dosed with a certain concentration. Safety improves as $LD_{50}$ increases.

As is clear from Table 11, an aqueous ink composition of the present invention is 5 to 8 times more safe than a conventional aqueous ink composition. Therefore, to maintain this standard of safety, triethanolamine used in the present invention is limited to triethanolamine meeting the standards described in the present specification and the Japanese Standards of Cosmetic Ingredient (Yakuji Nippo, Ltd., second edition).

Components listed in Table 1 were mixed in the ratio indicated in the table, and then stirred for 5 hours to prepare the aqueous red ink compositions of Example 1 and Comparative Examples 1 and 2.

Components listed in Table 3 were mixed in the ratio indicated in the table, and then stirred for 5 hours to prepare the aqueous black ink compositions of Example 2 and Comparative Examples 3 and 4.

Components listed in Table 5 were mixed in the ratio indicated in the table, and then stirred for 5 hours to prepare the aqueous red ink compositions of Example 3 and Comparative Examples 5 and 6.

Components listed in Table 7 were mixed in the ratio indicated in the table, and then stirred for 5 hours to prepare the aqueous yellow ink compositions of Example 4 and Comparative Examples 7 and 8.

Components listed in Table 9 were mixed in the ratio indicated in the table, and then stirred for 5 hours to prepare the aqueous green ink compositions of Example 5 and Comparative Examples 9 and 10.

11

In Comparative Example 1, no pH adjustor was used. In Comparative Example 2, triethanolamine was replaced with potassium carbonate (0.1N), which is described as a pH adjustor in the Japanese Standards of Food Additives (Tokyo, Ministry of Health and Welfare, sixth edition).

In Comparative Example 3, no pH adjustor was used. In Comparative Example 4, triethanolamine was replaced with sodium lactate, which is described as a pH adjustor in the Japanese Standards of Food Additives (Tokyo, Ministry of Health and Welfare, sixth edition).

In Comparative Example 5, no pH adjustor was used. In Comparative Example 6, triethanolamine was replaced with potassium carbonate (0.1N), which is described as a pH adjustor in the Japanese Standards of Food Additives (Tokyo, Ministry of Health and Welfare, sixth edition).

In Comparative Example 7, no pH adjustor was used. In Comparative Example 8, triethanolamine was replaced with L-ascorbic acid, which is described as a pH adjustor in the Japanese Standards of Food Additives (Tokyo, Ministry of Health and Welfare, sixth edition).

In Comparative Example 9, no pH adjustor was used. In Comparative Example 10, triethanolamine was replaced with disodium hydrogen phosphate, which is described as a pH adjustor in the Japanese Standards of Food Additives (Tokyo, Ministry of Health and Welfare, sixth edition).

The aqueous ink compositions prepared in Examples 1–5 and Comparative Examples 1–10 were stored in a thermostatic chamber at 50° C. and −10° C. for 3 months. Stability over time, as indicated by pH value, change of color, and the presence of a solid, and resistance to contamination were measured and compared. The results are shown in Tables 2, 4, 6, 8 and 10.

The measurements of these qualities in the examples were evaluated by the following methods.

The change in color was evaluated from the combination of the following two methods. One method involved evaluation of a written spiral line. The line was made on writing papers of the same lot (JIS P3201, writing paper A, unit weight 28.5) with an ink product, and a difference in the color from the initial ink product was visually discerned. The other method was evaluation by an H V/C measurement which involves part of the ink product being sampled and then spread on AH Kent paper (JIS 3301, a drawing paper A, unit weight 200). An irritant value was directly measured by the use of a photoelectric colorimeter.

The deposition of the solid was evaluated by dropping one drop of an ink product on filter paper (No. 2, made by Toyo Filter Paper Co., Ltd.) by a syringe, and then visually observing the presence or absence of a deposit.

Resistance to contamination was evaluated by adding a certain amount of each of bacteria of groups I and II (as indicated below) to an ink product and by applying a certain amount of the ink onto the culture medium of the bacteria, and measuring the effect on bacterial numbers with time (i.e., the death rate of the bacteria at the zero, first, second, third, seventh and fourteenth days).

| Medium | Bacteria | Culture |
| --- | --- | --- |
| Group I | Escherichia coli ATCC 8739 Staphylococcus aureus ATCC 6538 Pseudomonas aeruginosa ATCC | SCDA |

12
-continued

| Medium | Bacteria | Culture |
| --- | --- | --- |
| Group II | 9027 Candida albicans ATCC 10231 | GPLP |

The bacteria in the groups I and II (the so-called USP strain) have been identified on the basis of microorganism inspection in accordance with the Pharmaceutical Affairs Law of the U.S.A. The minimum required resistance to contamination for cosmetics and foods can be tested using these bacteria.

As is apparent from the results in Tables 2, 4, 6, 8 and 10, when Examples 1–5 are compared to Comparative Examples 1–10, the triethanolamine used for Examples 1–5 is responsible for imparting an excellent stability with time of pH value, stability of color, lack of solid deposition and resistance to contamination with all conditions.

In contrast, in Comparative Examples 1, 3, 5, 7 and 9 to which no pH adjustor is used the pH value changes greatly, as indicated by the resulting change of the color and the deposition of a solid. This problem is particularly acute when the ink is stored at −10° C. for three months. In addition, the resistance to contamination is noticeably reduced.

In Comparative Examples 2, 4, 6, 8 and 10 in which triethanolamine was replaced with other components prescribed as the pH adjustors in the Japanese Standards of Food Additives (Tokyo, Ministry of Health and Welfare, sixth edition), a change of the color and deposition of the solid is seen, as was seen in Comparative Examples 1,3, 5, 7 and 9. In addition, the resistance to contamination is noticeably reduced.

Additionally, further experiments were performed to demonstrate the unexpectedly superior properties of the aqueous ink compositions of the present invention. Tables 12 and 13 indicate the formulations used for these additional experiments. Specifically, experiments A1–A3 are compositions within the present invention, while experiments B1–B5 are outside the scope of the invention.

The aqueous ink compositions of experiments A1–A3 and B1–B5 were stored in a thermostatic chamber at 50° C. and −10° C. for 3 months. Stability over time, as indicated by pH value, change of color, and the presence of a solid, and resistance to contamination were measured and compared. The results are shown in Tables 14 and 15.

As shown in the tables, when the amount of triethanolamine was less than 0.01% by weight, the pH value of the stored ink changed by more than 1.0 than the ink compositions of the present invention. The change in pH led to a change in color, the deposition of a solid, and a decrease in resistance to contamination. Especially a −10° C., the solid deposited after freezing could not be reintroduced into solution and there was a marked change in color and a failure of the preservative. In addition, when the amount of triethanolamine was more than 1.00% by weight, the pH of the ink composition increased with storage, so that preservative effectiveness was decreased, although a color change or deposition of a solid was not noted.

Thus, the addition of triethanolamine in an amount of 0.1% to 1.00% is necessary to produce an aqueous ink composition which remains stable upon storage, thus avoiding changes in color, deposition of solids, or increased susceptibility to microbial contamination. It also prevents the ink composition from freezing, which avoids the formation of needle crystals within the ink and promotes redissolution upon warming of any solid which should form at low temperatures.

TABLE 1

|  | Example 1 | Comparative Example 1 | Comparative Example 2 |
|---|---|---|---|
| Red No. 104 for Food | 3.00% | 3.00% | 3.00% |
| Yellow No. 5 for Food | 1.00% | 1.00% | 1.00% |
| Propylene Glycol | 15.00% | 15.00% | 15.00% |
| Triethanolamine | 0.10% | — | — |
| Potassium Carbonate (0.1N) | — | — | 3.00% |
| Ethyl Para-hydroxybenzoate | 0.15% | 0.15% | 0.15% |
| Propyl Para-hydroxybenzoate | 0.05% | 0.05% | 0.05% |
| Butyl Para-hydroxybenzoate | 0.02% | 0.02% | 0.02% |
| Wate | 79.68% | 79.68% | 76.68% |
| Initial pH Value | 7.7 | 7.6 | 7.9 |

TABLE 2

| Standing Temperture | Kind of Ink | pH Value | Change of Color | Deposition of Solid | Preservation Resistance |
|---|---|---|---|---|---|
| 50° C. | Example 1 | 7.7 | o | o | o |
|  | Comp. Ex. 1 | 7.6 | Δ | o | Δ |
|  | Comp. Ex. 2 | 7.9 | Δ | o | x |
| −10° C. | Example 1 | 7.7 | o | o | o |
|  | Comp. Ex. 1 | 7.6 | x | x | x |
|  | Comp. Ex. 2 | 7.9 | x | x | x |

The ranking of evaluation in this table is as follows:
o: Not changed from the initial value.
Δ: Slightly changed from the initial value (the quality is poor).
x: Largely changed from the intial value (the product cannot be used).

TABLE 3

|  | Example 2 | Comparative Example 3 | Comparative Example 4 |
|---|---|---|---|
| Red No. 3 for Food | 4.00% | 4.00% | 4.00% |
| Yellow No. 4 for Food | 0.80% | 0.80% | 0.80% |
| Blue No. 2 for Food | 3.00% | 3.00% | 3.00% |
| Propylene Glycol | 20.00% | 20.00% | 20.00% |
| Triethanolamine | 0.10% | — | — |
| Sodium Lactate | — | — | 0.70% |
| Sodium Benzoate | 0.60% | 0.60% | 0.60% |
| Sodium Dehydroacetic Acid | 0.50% | 0.50% | 0.50% |
| P-hydroxy Butyl Benzoate | 0.02% | 0.02% | 0.02% |
| Water | 70.98% | 71.08% | 70.38% |
| Initial pH Value | 7.8 | 7.4 | 7.3 |

TABLE 4

| Standing Temperture | Kind of Ink | pH Value | Change of Color | Deposition of Solid | Preservation Resistance |
|---|---|---|---|---|---|
| 50° C. | Example 2 | 8.0 | o | o | o |
|  | Comp. Ex. 3 | 7.8 | Δ | o | Δ |
|  | Comp. Ex. 4 | 7.8 | Δ | o | x |
| −10° C. | Example 2 | 7.5 | o | o | o |
|  | Comp. Ex. 3 | 5.0 | x | x | x |
|  | Comp. Ex. 4 | 5.9 | x | x | x |

The ranking of evaluation in this table is as follows:
o: Not changed from the initial value.
Δ: Slightly changed from the initial value (the quality is poor).
x: Largely changed from the intial value (the product cannot be used).

TABLE 5

|  | Example 3 | Comparative Example 5 | Comparative Example 6 |
|---|---|---|---|
| Red No. 3 for Food | 3.00% | 3.00% | 3.00% |
| Yellow No. 5 for Food | 1.00% | 1.00% | 1.00% |
| Propylene Glycol | 15.00% | 15.00% | 15.00% |
| Triethanolamine | 0.10% | — | — |
| Potassium Carbonate (0.1N) | — | — | 3.00% |
| Ethyl Para-hydroxybenzoate | 0.15% | 0.15% | 0.15% |
| Propyl Para-hydroxybenzoate | 0.05% | 0.05% | 0.05% |
| Butyl Para-hydroxybenzoate | 0.02% | 0.02% | 0.02% |
| Wate | 79.68% | 79.68% | 76.68% |
| Initial pH Value | 7.7 | 7.6 | 7.9 |

TABLE 6

| Standing Temperture | Kind of Ink | pH Value | Change of Color | Deposition of Solid | Preservation Resistance |
|---|---|---|---|---|---|
| 50° C. | Example 3 | 7.7 | o | o | o |
|  | Comp. Ex. 5 | 7.6 | Δ | o | Δ |
|  | Comp. Ex. 6 | 7.9 | Δ | o | x |
| −10° C. | Example 3 | 7.7 | o | o | o |
|  | Comp. Ex. 5 | 6.6 | x | x | x |
|  | Comp. Ex. 6 | 7.9 | x | x | x |

The ranking of evaluation in this table is as follows:
o: Not changed from the initial value.
Δ: Slightly changed from the initial value (the quality is poor).
x: Largely changed from the intial value (the product cannot be used).

TABLE 7

|  | Example 4 | Comparative Example 7 | Comparative Example 8 |
|---|---|---|---|
| β-cartene | 1.00% | 1.00% | 1.00% |
| Yellow No. 4 for Food | 3.00% | 3.00% | 3.00% |
| Propylene Glycol | 25.00% | 25.00% | 25.00% |
| Triethanolamine | 0.10% | — | — |
| L-ascorbic Acid | — | — | 0.10% |
| Ethyl Para-hydroxybenzoate | 0.15% | 0.15% | 0.15% |
| Propyl Para-hydroxybenzoate | 0.05% | 0.05% | 0.05% |
| Butyl Para-hydroxybenzoate | 0.02% | 0.02% | 0.02% |
| Water | 70.68% | 70.78% | 70.68% |

TABLE 7-continued

|  | Example 4 | Comparative Example 7 | Comparative Example 8 |
|---|---|---|---|
| Initial pH Value | 6.6 | 6.4 | 6.0 |

TABLE 8

| Standing Temperture | Kind of Ink | pH Value | Change of Color | Deposition of Solid | Preservation Resistance |
|---|---|---|---|---|---|
| 50° C. | Example 4 | 6.6 | o | o | o |
|  | Comp. Ex. 7 | 6.4 | x | o | o |
|  | Comp. Ex. 8 | 6.0 | x | x | Δ |
| −10° C. | Example 4 | 6.6 | o | o | o |
|  | Comp. Ex. 7 | 4.5 | x | x | x |
|  | Comp. Ex. 8 | 4.9 | x | x | x |

The ranking of evaluation in this table is as follows:
o: Not changed from the initial value.
Δ: Slightly changed from the initial value (the quality is poor).
x: Largely changed from the intial value (the product cannot be used).

TABLE 9

|  | Example 5 | Comparative Example 9 | Comparative Example 10 |
|---|---|---|---|
| Yellow No. 4 for Food | 0.80% | 0.80% | 0.80% |
| Blue No. 2 for Food | 3.00% | 3.00% | 3.00% |
| Propylene Glycol | 15.00% | 15.00% | 15.00% |
| Glycerol | 3.00% | 3.00% | 3.00% |
| Ethanol | 5.00% | 5.00% | 5.00% |
| Triethanolamine | 0.10% | — | — |
| Disodium Hydrogenhposphate | — | — | 0.01% |
| Sodium Dehydroacetic Acid | 0.50% | 0.50% | 0.50% |
| Propyl Para-hydroxybenzoate | 0.02% | 0.02% | 0.02% |
| Butyl Para-hydroxybenzoate | 0.02% | 0.02% | 0.02% |
| Water | 72.56% | 72.66% | 72.65% |
| Initial pH Value | 6.5 | 6.3 | 6.8 |

TABLE 10

| Standing Temperture | Kind of Ink | pH Value | Change of Color | Deposition of Solid | Preservation Resistance |
|---|---|---|---|---|---|
| 50° C. | Example 5 | 5.8 | o | o | o |
|  | Comp. Ex. 9 | 4.5 | x | x | x |
|  | Comp. Ex. 10 | 5.8 | Δ | Δ | x |
| −10° C. | Example 5 | 6.0 | o | o | o |
|  | Comp. Ex. 9 | 5.8 | x | Δ | o |
|  | Comp. Ex. 10 | 6.3 | x | x | x |

The ranking of evaluation in this table is as follows:
o: Not changed from the initial value.
Δ: Slightly changed from the initial value (the quality is poor).
x: Largely changed from the intial value (the product cannot be used).

TABLE 11

| Classification | Product | $LD_{50}$ (mg/kg) |
|---|---|---|
| Felt-tip pen | Aqueous ink composition (present invention) | 19500–46100 |
|  | Aqueous ink composition (industrial triethanolamine) | 17300–40800 |
| Raw material | Conventional aqueous ink composition | 3300–5700 |
|  | Cosmetic triethanolamine | 8600 |
|  | Industrial triethanolamine | 7400 |
|  | Dimethyl nitrosamine | 0 |
|  | Diethyl nitrosamine | 15 |

TABLE 12

| | Experiment | | | | | | | |
|---|---|---|---|---|---|---|---|---|
| 50° C. | B1 | B2 | A1 | A2 | A3 | B3 | B4 | B5 |
| pH value | | | | | | | | |
| Initial value | 6.5 | 6.9 | 7.3 | 8.3 | 8.7 | 8.8 | 8.9 | 9.1 |
| After 3 months | 4.8 | 5.8 | 6.5 | 7.5 | 7.9 | 8.0 | 8.0 | 8.0 |
| Change in color | x | Δ | o | o | o | o | o | o |
| Deposition of solid | x | x | o | o | o | o | o | o |
| Preservation Resistance | x | Δ | o | o | o | Δ | x | x |

The ranking of evaluation in this table is as follows:
o: Not changed from the initial value
Δ: Slightly changed from the initial value (the quality is poor)
x: Largely changed from the initial value (the product cannot be used)

TABLE 13

| | Experiment | | | | | | | |
|---|---|---|---|---|---|---|---|---|
| −10° C. | B1 | B2 | A1 | A2 | A3 | B3 | B4 | B5 |
| pH value | | | | | | | | |
| Initial value | 6.5 | 6.9 | 7.3 | 8.3 | 8.7 | 8.8 | 8.9 | 9.1 |
| After 3 months | 4.3 | 5.9 | 7.3 | 8.3 | 8.7 | 8.7 | 9.1 | 9.1 |
| Change in color | x | x | o | o | o | o | o | o |
| Deposition of solid | x | x | o | o | o | o | o | o |
| Preservation Resistance | x | x | o | o | o | Δ | Δ | x |

The ranking of evaluation in this table is as follows:
o: Not changed from the initial value
Δ: Slightly changed from the initial value (the quality is poor)
x: Largely changed from the initial value (the product cannot be used)

What is claimed is:

1. An aqueous ink composition, comprising;
    at least one food additive dye described in Japanese Standards of Food Additives or a dye which is a conformed material;
    water; and
    triethanolamine prescribed in Japanese Standards of Cosmetic Ingredients as a pH adjustor, wherein the amount of triethanolamine ranges from 0.01 to 1.0% by weight based on the total weight of the aqueous ink composition.

2. The aqueous ink composition according to claim 1, further comprising at least one of (a) a food additive solvent described in Japanese Standards of Food Additives, (b) a food additive surface active agent described in Japanese Standards of Food Additives, (c) a food additive preservative described Japanese Standards of Food Additives, (d) a solvent, surface active agent, or preservative which is a conformed material, and (e) mixtures of any of the foregoing.

3. The aqueous ink composition according to claim 2, wherein the solvent is selected from the group consisting of glycerin, D-sorbitol, propylene glycol, and mixtures of any of the foregoing.

4. The aqueous ink composition according to claim 2, wherein the surface active agent is selected from the group consisting of an ester of glycerin and a fatty acid, an ester of sucrose and a fatty acid, an ester of sorbitan and a fatty acid, an ester of propylene glycol and a fatty acid, and mixtures of any of the foregoing.

5. The aqueous ink composition according to claim 2, wherein the preservative is selected from the group consisting of sodium dehydroacetate, sorbic acid, potassium sorbate, benzoic acid, sodium benzoate, a parahydroxybenzoate, propionic acid, sodium propionate, and mixtures of any of the foregoing.

* * * * *